July 2, 1946.          R. E. GARRETT          2,403,357
GEARED CENTER RAISER FOR LATHES
Filed Sept. 29, 1944          2 Sheets-Sheet 1

R. E. Garrett   INVENTOR.
BY
ATTORNEYS.

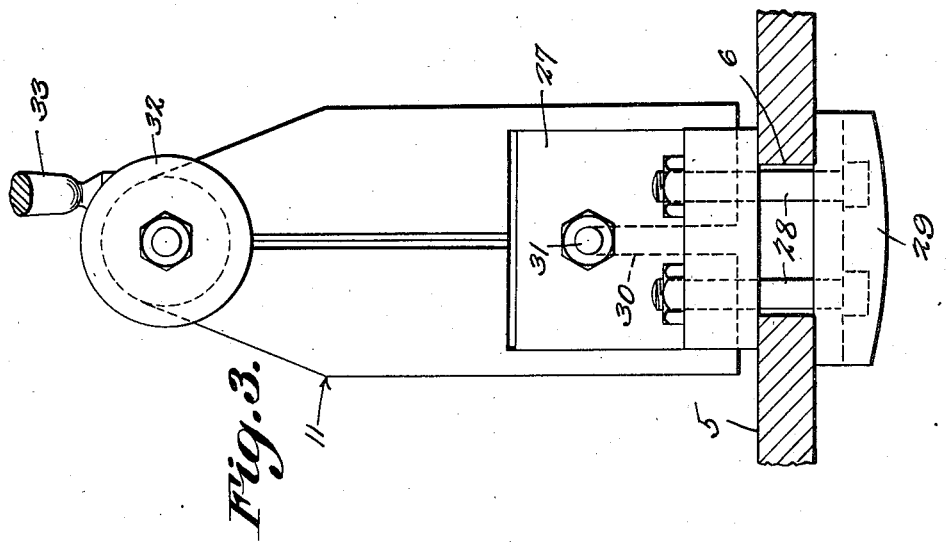
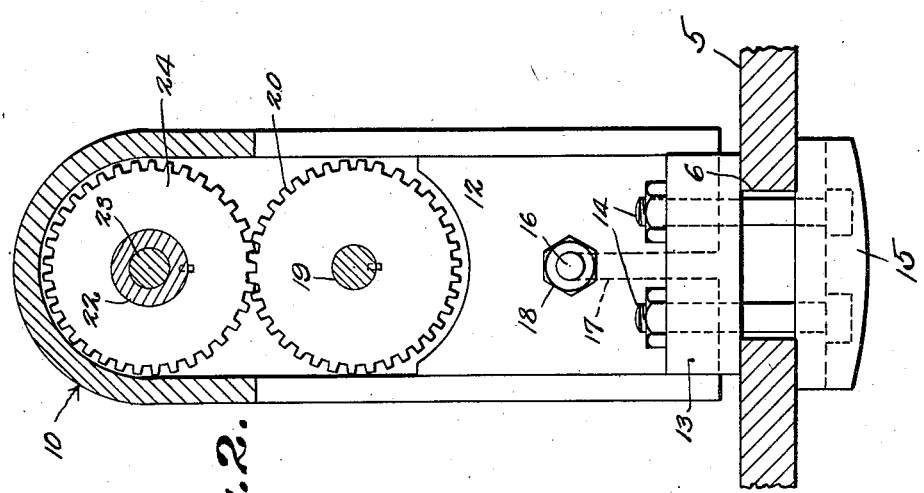

Patented July 2, 1946

2,403,357

UNITED STATES PATENT OFFICE 2,403,357

GEARED CENTER RAISER FOR LATHES

Robert E. Garrett, Nashville, Tenn.

Application September 29, 1944, Serial No. 556,409

1 Claim. (Cl. 82—28)

This invention relates to machine lathes, the primary object of the invention being to provide an attachment to be mounted on a lathe, by means of which the centers of the lathe may be adjusted vertically, thereby adapting the lathe for use in turning objects of larger sizes.

An important object of the invention is to provide an attachment of this character which will be exceptionally strong and serviceable, to the end that the article under treatment will be accurately turned.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Figure 2 is a sectional view taken on line 2—2 of Fig. 1.

Figure 3 is a sectional view taken on line 3—3 of Fig. 1.

Figure 1:
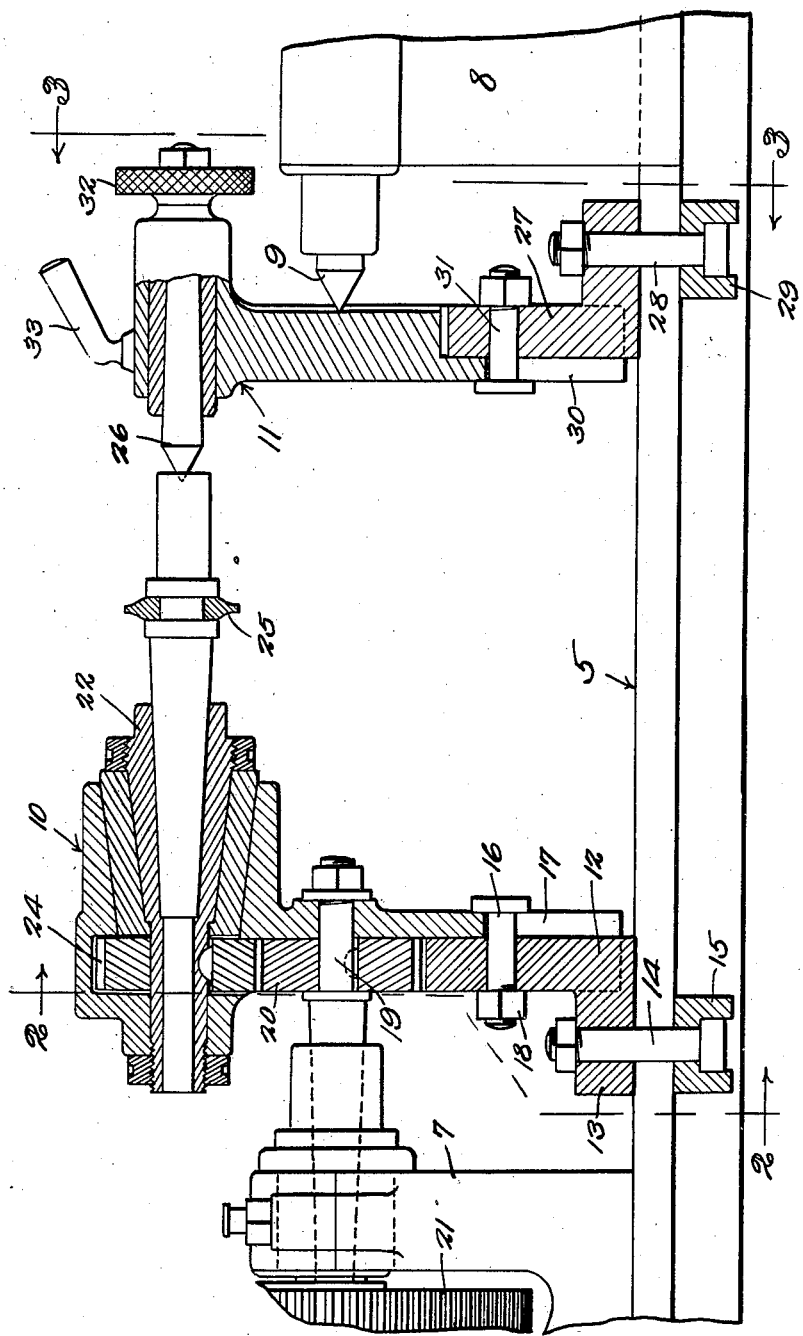
Figure 1 is a longitudinal sectional view through an attachment constructed in accordance with the invention, illustrating the attachment as positioned on a lathe bed.

Referring to the drawings in detail, the reference character 5 designates the bed of a lathe, which is formed with the usual slot 6 extending longitudinally thereof, through which the supporting bolts of the head stock and tail stock of a lathe extend, securing the head stock and tail stock to the bed 5.

The reference character 7 indicates the head stock of the lathe, which is provided with the usual standard taper for the reception of the shaft on which the cutter of the lathe is mounted.

The reference character 8 designates the tail stock of the lathe, which supports the standard taper 9.

The attachment forming the subject matter of the present invention, embodies an adjustable head stock indicated generally by the reference character 10 and an adjustable tail stock indicated by the reference character 11.

The adjustable head stock, comprises a bracket or support 12 which has a base 13 formed with openings to receive the bolts 14 which bolts also pass through the lug 15 which is held within the recessed lower surface of the bed plate, as shown by Fig. 2 of the drawings.

An opening is formed in the bracket 12, for the reception of the bolt 16 which is positioned within the slots 17 of the body of the adjustable head stock, so that the body of the head stock may be adjusted vertically by loosening the nut 18 on one end of the bolt 16, and moving the body portion vertically. The nut 18 may now be tightened to secure the body portion in its position of adjustment.

A bearing is provided in the body portion, for the reception of the shaft 19 which is formed with a tapered end fitted within the taper of the head stock proper. A gear indicated at 20 is keyed on the shaft 19 to rotate therewith. It is of course to be understood that the shaft 19 receives its motion from the usual lathe gearing, indicated by the reference character 21, and which is mounted at one end of the shaft 19.

Supported within the upper end of the body of the detachable head stock, is a standard taper 22 in which the standard taper arbor 23 is secured. A gear indicated at 24 is keyed to the standard taper, and receives motion from the gear 20 which is in mesh therewith. Thus it will be seen that due to this construction, the arbor 23 carrying the cutter 25, will be rotated, through the gears. It will also be noted that the arbor 23 is of a length to engage the center 26 of the adjustable tail stock 11. This adjustable tail stock 11 also includes a bracket 27 that slides along the bed of the lathe, and is held in position by means of the bolts 28 that pass through the lug 29 mounted under the lathe, securing the bracket 27 in position. The tail stock 11 is formed with a slot 30 that accommodates the bolt 31 that also passes through the bracket 27 adjustably securing the main portion of the adjustable tail stock, to the bed of the lathe.

The upper portion of the adjustable tail stock is formed with an opening, in which the center 26 is held, by means of the knurled nut 32. On positioning the adjustable tail stock 11, the tail stock 11 is placed in contact with the standard taper 9 of the tail stock, as shown by Fig. 1 of the drawings. In moving the adjustable tail stock, the handle 33 is gripped by the operator and the tail stock slid along the bed of the lathe to its proper position.

From the foregoing it will be seen that due to the construction shown and described, I have provided a geared center raiser for the usual lathe, whereby articles of various sizes may be held within the lathe and turned, by merely adjusting the adjustable head and tail stocks vertically to adapt the attachment for use with a lathe head stock of a particular size.

What is claimed is:

An adjustable head stock attachment for lathes, comprising a base including an upstanding bracket, a body portion having parallel flanges formed along the side edges thereof adapted to be positioned over the bracket, said flanges contacting opposite side edges of the bracket, said body portion having a slot extending inwardly from the lower end thereof, at a point between the flanges, a bolt extending through the slot and upstanding bracket, the head of the bolt being in contact with the body portion adjustably securing the body portion to the bracket, a tapered power shaft mounted in the body portion adapted to fit in the tapered socket of a head stock to rotate therewith, a gear secured to the latter shaft, a standard taper arbor mounter within the body portion, a gear in mesh with the first mentioned gear and being secured to the standard taper arbor, whereby rotary movement is imparted to the standard taper arbor from said power shaft.

ROBERT E. GARRETT.